April 28, 1970   F. W. MILLER III   3,508,662
DISPOSABLE, LOW-PRIME SPIRALLY WOUND, ARTIFICIAL KIDNEY
Filed Jan. 21, 1969   3 Sheets-Sheet 1

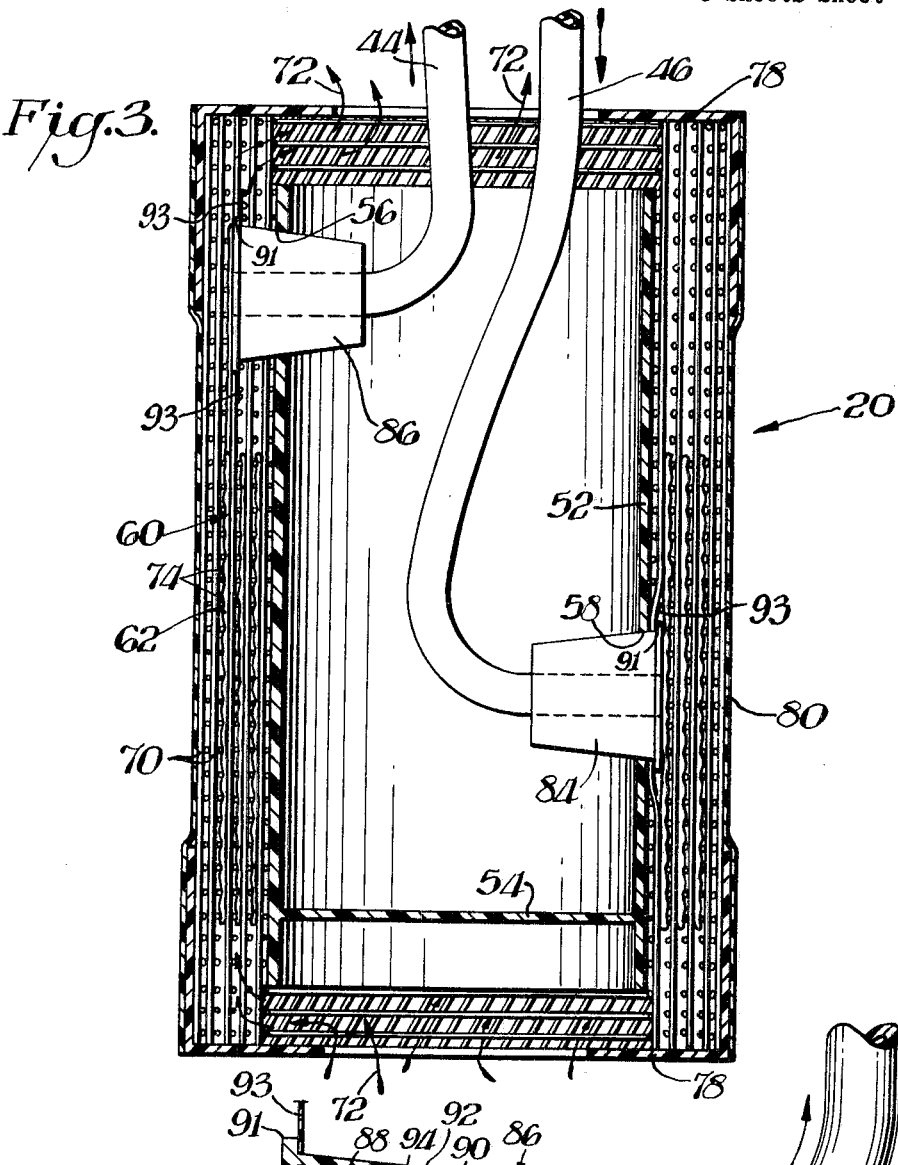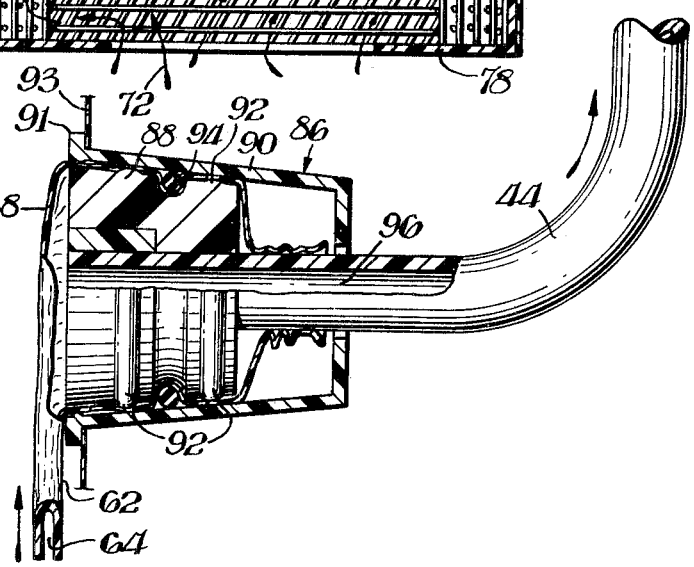

April 28, 1970 F. W. MILLER III 3,508,662
DISPOSABLE, LOW-PRIME SPIRALLY WOUND, ARTIFICIAL KIDNEY
Filed Jan. 21, 1969 3 Sheets-Sheet 3
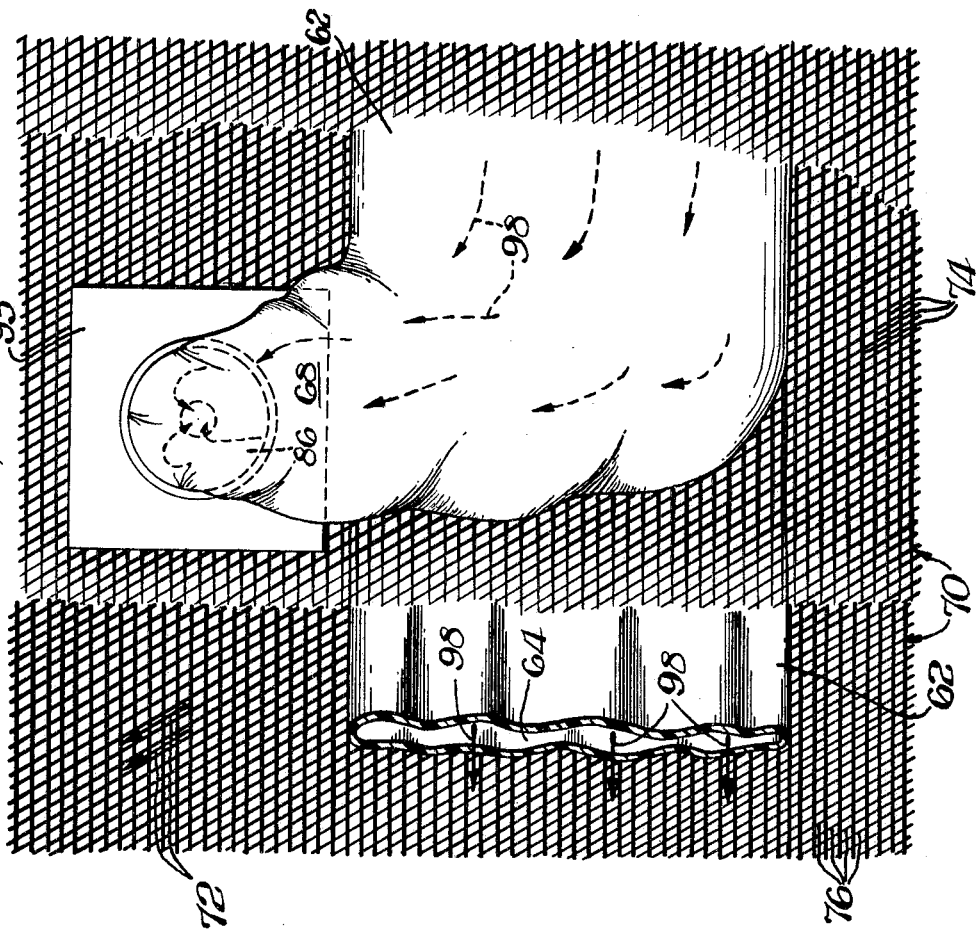
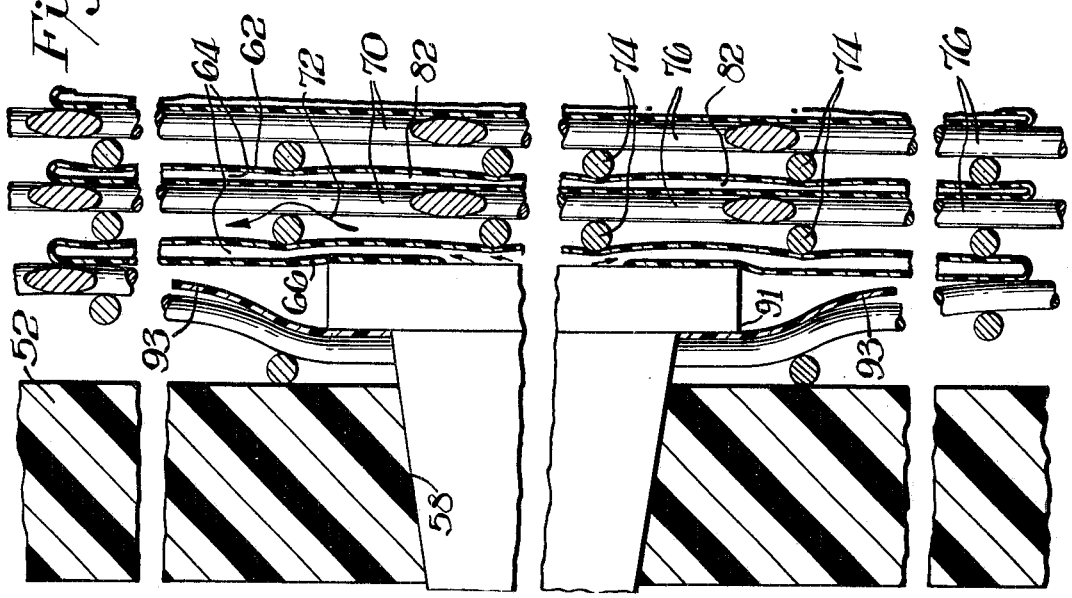

United States Patent Office 3,508,662
Patented Apr. 28, 1970

3,508,662
DISPOSABLE, LOW-PRIME, SPIRALLY WOUND, ARTIFICIAL KIDNEY
Frederick W. Miller III, Avondale, Pa., assignor to Extracorporeal Medical Specialties, Inc., a corporation of Pennsylvania
Filed Jan. 21, 1969, Ser. No. 792,507
Int. Cl. B01d 31/00, 13/00
U.S. Cl. 210—321                 10 Claims

ABSTRACT OF THE DISCLOSURE

An extracorporeal, disposable, low-prime, artificial kidney coil unit or dialyzer cartridge for use in artificial kidney systems of the general type including a tank for dialyzing fluid having a support for the coil unit and means for supplying dialyzing fluid to one end of the coil unit, wherein the coil unit has a single tubular membrane of regenerated cellulose produced by the cuprammonia process providing a continuous, elongated spiral blood passage, large diameter adapter plug connections between the blood inlet tubing and the tubular membrance and between the membrane and the blood outlet tubing, and a single layer of membrane spacing and supporting mesh of non-woven plastic such as polyolefin wider than the flattened membrane and having longitudinal strands on one face and angled cross-strands on the other face which is spirally wrapped in sandwiched relationship to the tubular membrane.

BACKGROUND OF THE INVENTION

The invention relates to the field of separation in which different fluids are separated by a permeable membrane so that one or more components of one fluid will pass through the membrane to the other fluid, such as dialysis or ultrafiltration, the removal of salt from sea water, the removal of liquid components by pervaporation, and as a permeator for separating components of gaseous mixtures. For purposes of illustration, the disclosed and claimed invention relates particularly to an artificial kidney system for treating human blood, to properly balance its various components as in acute or chronic renal failure, the removal of exogenous or endogenous poisons, or the like, of the type wherein a length of flattened tubular dialyzing membrane forming a blood passage is coiled in conjunction with spacing and supporting mesh forming a passage for dialyzing solution to provide a compact, portable, disposable and relatively rugged coil unit or dialyzer cartridge.

Prior to the present invention, artificial kidney systems of the type including a tank for recirculating dialyzing fluid having a support for a coil unit and means for supplying dialyzing fluid to one end of the coil unit have been recognized and accepted for clinical use by the medical profession, and have extended numerous human lives, one such system being disclosed in Broman Patent 2,969,150 issued Jan. 1961. The artificial kidney coil units previously commercially available for systems of this type have for the most part been manufactured generally according to the disclosure of Metz Patent 2,880,501 issued Apr. 1959. Such artificial kidney coil units heretofore commercially available, however, have been beset with several recognized problems.

First, virtually all of the available coil type units required a high volume of human blood for priming, in the neighborhood of 500 ml. to 1,000 ml. and more. High priming volume generates several problems, such as storage and reuse of the individual patient's blood, down time in event of rupture or other interruption, the expense of the blood required for priming, and the wait for blood from a blood bank, which may take half a day or more.

Second, to achieve the desired ratio of large surface contact area between the blood and the permeable membrane, and low resistance to flow of the blood through the membrane tubing, units of unwieldly size and shape have been proposed. The practical problems of shipping and storage with units of this nature are self-evident, not to mention their prohibitive expense.

Units such as the ones disclosed in the aforesaid Broman and Metz patents embody twin coils of membrane tubing axially displaced from each other, the tubes so narrow that two must be used in parallel if an acceptable ratio of surface contact area to flow resistance is to result. Furthermore, the critical connections between the two blood inlet tubes and the tubular membranes and the two blood outlet tubes and the tubular membranes increase leakage problems with the tubular membrane unless it is made of sufficiently strong material—but the desired permeability value of the membrane material goes down as the strength of the material goes up. Furthermore, the twin coils double the time and expense and increase the opportunity for improper hook-up of the coil unit to the patient.

Thus, the problem heretofore unsolved by the prior art is the provision of an inexpensive and disposable low-prime artificial kidney coil unit or dialyzer cartridge.

SUMMARY OF THE INVENTION

This invention provides an inexpensive and disposable low-prime artificial kidney coil unit or dialyzer cartridge, for use in an artificial kidney system of the general type including a tank for dialyzing fluid having a support for the artificial kidney coil unit and means for supplying dialyzing fluid to one end of a coil unit supported within the tank. The coil unit comprises an inner core with a single elongated tubular membrane providing a spiral blood passage and a single length of membrane supporting mesh spirally wrapped in sandwiched relationship to each other around the core. The membrane support mesh is preferably non-woven plastic such as polyolefin and includes essentially parallel strands on one face which are oriented in a longitudinal or horizontal direction and support the outer side of one layer of the tubular membrane, and essentially parallel strands on the other face which are oriented at a substantial angle to the longitudinal strands and support the inner side of an adjacent layer of the tubular membrane. The individual strands of the mesh have a diameter in excess of about 0.3 mm., and the strands are spaced apart at least about 0.6 mm. The tubular membrane consists of regenerated cellulose produced by the cuprammonia process having a thickness in excess of about 10 microns, and has a girth of between about 15 cm. and about 25 cm. which when flattened between adjacent wraps of the supporting mesh provides a blood passage having a height of between about 7.5 cm. and about 12.5 cm. and an average thickness of less than about 700 microns. Finally, the connections between the blood inlet tubing and the tubular membrane and between the blood outlet tubing and the tubular membrane each include a tapered adapter plug having an outer girth of at least about 7.5 cm., a flanged outer sleeve for tightly securing an end of the tubular membrane to the plug, and a smaller flow passage through the plug communicating at one end with the blood passage inside the tubular membrane and at the other end with the exterior of the plug outside of the tubular membrane for connection with the blood tubing.

BRIEF DESCRIPTION OF THE DRAWINGS

Numerous advantages of the present invention will become apparent to one skilled in the art from a reading of the detailed description in conjunction with the accompanying drawings wherein similar reference characters refer to similar parts and in which:

FIG. 3 is a transverse sectional elevational view of the coil unit of FIG. 2, with the true scale selectively distorted for purposes of clarity;

FIG. 4 is a greatly magnified fragmentary sectional elevational view showing the blood passage and showing the connection of the tubular membrane with the blood inlet tubing;

FIG. 5 is a developed fragmentary elevational view with parts broken away to show the sandwiched layers of tubular membrane and supporting mesh, and showing the connection of the tubular membrane with the blod outlet tubing; and, FIG. 6 is a sectional view of the connection between the tubular membrane and the blood tubing.

DETAILED DESCRIPTION

Figure 1:
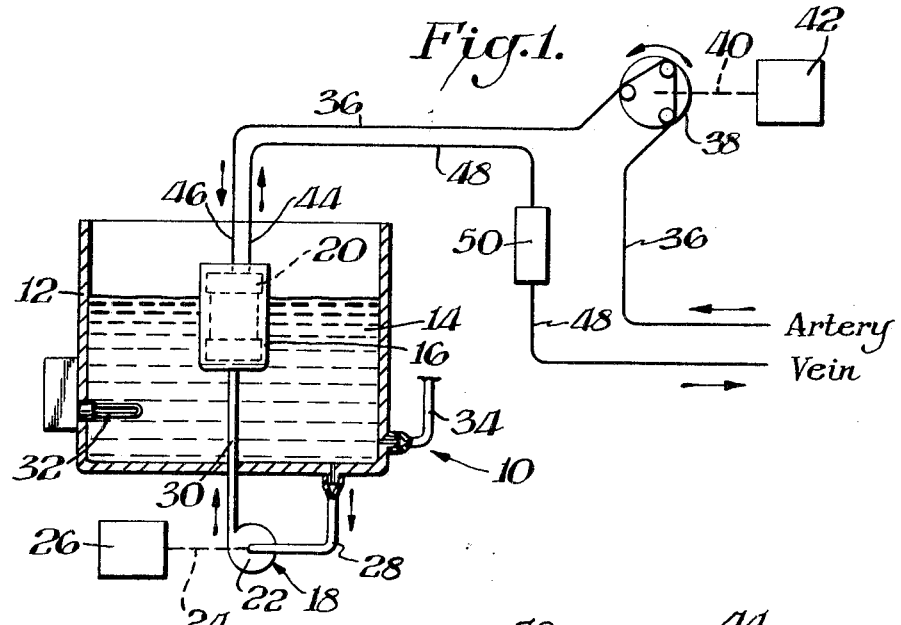
FIG. 1 is a schematic illustration of an artificial kidney system of the type including a dialyzing fluid tank having a support for an artifiicial kidney coil unit and means for supplying dialyzing fluid to one end of a coil unit supported within the tank.

Referring in more particularity to the drawings, there is illustrated in schematic fashion in FIG. 1 a known artificial kidney system 10 of the type including a tank 12 for recirculating dialyzing fluid 14, and having a support 16 therein for an artifiicial kidney coil unit and means 18 for supplying dialyzing fluid at a controlled rate and pressure to one end of a coil unit supported in the tank.

The artificial kidney coil unit 20 according to this invention is illustrated in more detail in FIGS. 2 through 6. It may be used with artificial kidney systems other than the recirculating one illustrated schematically in FIG. 1, such as the single pass recirculating systems presently in use, and the details of the system indicated in FIG. 1 should in no sense be interpreted as limiting the environment in which the coil unit of this invention may be utilized.

The means 18 for supplying dialyzing fluid comprises a pump 22 connected as at 24 to be driven by a power source such as an electrically powered motor 26. A conduit 28 connected to the inflow portion of the pump 22 also connects with the base of the tank 12, and another conduit 30 connected to the outflow portion of the pump 22 is connected to the base of the support 16 for supplying dialyzing fluid to the lower end of a coil unit 20 removably positioned in the support 16. A heating unit 32 may be provided, as well as an aerating connection 34 for proper control of the dialyzing fluid, in certain applications.

Blood from an artery of the patient is pumped through tubing 36 by means of a variable speed pump such as a "finger" pump or a roller pump 38 connected as at 40 to be driven by a power source such as electrically powered motor 42. The tubing 36 connects with the blood inlet tubing 46 of the coil unit 20. The blood outlet tubing 44 of the coil unit 20 connects with tubing 48 to return processed blood through a collection chamber 50 to exhaust any entrapped bubbles and thence to a vein of the patient.

Figure 2:
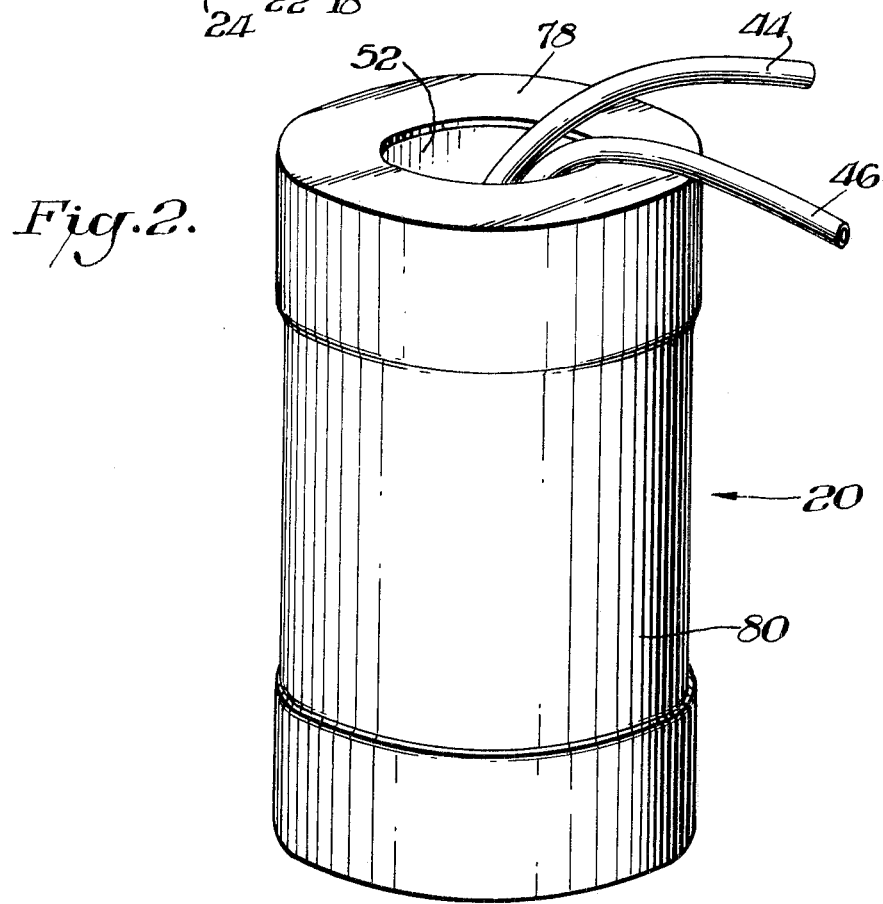
FIG. 2 is a perspective view of the disposable low-prime artifiicial kidney coil unit of this invention useful in the artificial kidney system of FIG. 1.

The coil unit 20, with particular reference to FIG. 2, is a compact, disposable cylindrical unit having blood inlet tubing 46 and blood outlet tubing 44 emerging from the upper end thereof, preferably with fixtures, not shown, for connection with the tubing 36 and 48, respectively.

With particular reference to FIGS. 3 through 6, the coil unit 20 comprises an inner tubular core 52 of generally hollow, cylindrical configuration made of non-toxic plastic or other suitable material. The core 52 is closed at end as at 54 to prevent passage of dialyzing fluid through the center of the core. The core may be open at the other end to provide access for the blood inlet tubing 46 and the blood outlet tubing 44. An upper aperture 56 extending radially through the cylindrical sidewall of the core receives an adapter plug for the connection with the blood outlet tubing 44 in a manner described in more detail below, and a lower aperture 58 extending radially through the sidewall receives a similar adapter plug for the connection with the blood inlet tubing 46 in a manner also described in more detail below.

Wrapped around the inner tubular core 52 is a coil means 60 which includes a single tubular membrane 62 providing a continuous, elongated spiral blood passage 64 connected at one end 66 to the blood inlet tubing 46 and at the other end 68 to the blood outlet tubing 44, and also including a single layer of membrane supporting mesh 70 spirally wrapped in sandwiched relationship to the tubular membrane 62 and providing an axial passage as at arrows 72 for flow of dialyzing fluid 44 from the lower end of the coil means to the upper end thereof. The membrane supporting mesh 70 includes essentially parallel strands 74 on one face thereof which are oriented in a longitudinal or horizontal direction and support one side of one wrap of the tubular member 62, and essentially parallel strands 76 on the other face thereof which are oriented at an angle to the longitudinal strands 74 and support the other side of an adjacent wrap of the membrane 62.

An outer housing member secured around the coil means 60 may include upper and lower collars or caps 78 to secure the spirally wrapped coil means in its properly coiled condition, and which have large central apertures to permit flow of dialyzing fluid into the lower end of the coil unit and out of the upper end of the coil unit, and also to permit access for blood tubing into the upper end of the core. An outer sheathing 80 may be applied outside the collars 78. The outer sheathing 80 may be plastic material having elastic or heat shrinkable qualities so that it snugly envelopes the cylindrical portions of the coil unit, and secures the collars 78 axially in place.

The membrane supporting mesh 70 has a width which is greater than half the girth of the tubular membrane 62. In one particular example, the supporting mesh is non-woven plastic such as polyolefin, for instance, polypropylene, having a width of at least about 12 cm., and preferably a width of 17 cm. Since the tubular membrane 62 preferably has a girth of between about 15 cm. and about 25 cm., and preferably a girth of about 20 cm., the width of the membrane supporting mesh is about 3 cm., and preferably about 5 cm. or more, greater than half the girth of the tubular membrane. In other words, with a tubular membrane having a flattened width of 10 cm., and supporting mesh having a width of approximately 17 cm., the wraps of membrane supporting mesh obviously extend laterally on both ends of the wraps of tubular membrane. This leaves room for an adapter plug, secured to the blood outlet tubing 44, to pass through an aperture in the laterally upwardly extending portion of the wraps of supporting mesh.

The individual strands of the supporting mesh have a diameter in excess of about 0.3 mm., and are spaced apart at least about 0.6 mm. In one preferred embodiment, the mesh has a strand diameter of between about 0.3 mm. and about 1.0 mm.; a diameter of about 0.4 to about 0.6 mm. with the strands spaced apart about 3 mm. on centers has been found convenient and efficient. The strands 74 which are oriented in a longitudinal or horizontal direction are continuous and are essentially parallel with the edge of the support mesh. The strands 76 on the other face of the supporting mesh are oriented at an angle of at least about 20° to the longitudinal strands, and preferably at an angle of between about 45° and 90°. An angle of about 60°, as illustrated in the the drawings, has been found efficient and convenient, and an angle of about 45° is equally useful.

In the embodiment illustrated, when the supporting mesh and the tubular membrane are spirally wrapped in sandwiched relationship (in practice they are wrapped tight enough to avoid the spaces which appear for purposes of clarity in FIG. 4), the radially outer side of the tubular membrane is supported by the face of the mesh which includes the strands 74 oriented in a longitudinal direction to provide a longitudinal channelling effect 82 to facilitate flow through the spiral blood passage. The inner side of the tubular membrane 62 is supported by the face of the mesh which includes the strands 76 oriented at an angle of about 60° to the longitudinal strands to provide a lateral channel effect as at 72 for flow of dialyzing fluid from one end of the coil means to the other end thereof.

After the tubular membrane and the supporting mesh are spirally wrapped around the inner core 52, a radial aperture is then provided in the laterally upwardly extending portion of the wraps of supporting mesh, as aforesaid, to receive the adapter plug which passes through the radial aperture 56 in the sidewall of the inner core 52.

The tubular membrane 62 consists of regenerated cellulose produced by the cuprammonia process having a dry thickness in excess of about 10 microns. In one commercial embodiment, Cuprophan tubing (supplied by J. P. Bemberg Company, Wuppertal, Germany) of approximately 15 to 18 micron thickness having a flattened width of 100 mm. and a length of 3.5 m. provides a dialyzing surface area of approximately 7,000 cm.$^2$. When flattened between adjacent wraps of the membrane supporting mesh in the final coil, such tubing provides a blood passage having an average thickness of less than about 700 microns, and preferably in the range of about 350 microns to about 500 microns. A tubular membrane of regenerated cellulose produced by the viscose process of approximately 12 to 15 micron thickness having the same flattened width has also been found useful.

The inlet end 66 of the tubular membrane 62 is connected with the inlet tubing 46 by means of a connection 84 received in the radial aperture 58 of the inner core. Similarly, the outlet end 68 of the tubular membrane 62 is connected with the blood outlet tubing 44 by means of a connection 86 received in the radial aperture in the laterally upwardly extending portion of the wraps of supporting mesh and through the radial aperture 56 aligned therewith in the sidewall of the inner core.

The connections 84 and 86 are similar, and a description of one will serve as a description for both. With particular reference to FIG. 6, the connection includes an adapter comprising a tapered plug 88 of medical grade elastomeric or rubber or other suitable material having a similarly tapered outer sleeve 90 for tightly securing one end 68 of the tubular membrane 62 to the plug. The outer sleeve 90 has a lateral flange 91 behind which a flexible plate 93 of plastic material is positioned to insure that the apertures in the mesh remain properly positioned relative to the connections. The outer surface of the plug 88 may include annular ribs 92 to provide a tight seal between the plug and the outer sleeve. In addition, a rubber O ring 94 may secure the tubular membrane in a peripheral groove around the plug to prevent leakage and pulling loose. A smaller flow passage 96 through the plug communicates at one end with the blood passage 64 inside the tubular membrane 62, and at the other end with the exterior of the adapter connection 86 outside the tubular membrane as at 44. The blood inlet or outlet tubing, respectively, is tightly secured in the smaller flow passage from the other direction. The adapter connection 86 has a girth somewhat smaller than the girth of the tubular membrane, but substantially greater than that of the blood inlet and outlet tubing. For instance, the outer girth is preferably at least about 7.5 cm., and a ribbed medical grade silicone rubber plug 25 mm. in diameter has proved efficient and practical, but the plug may be made of polyvinyl chloride if desired.

The advantage of the large diameter connection resides in the minimizing of high pressure on low area portions of the delicate tubular membrane, particularly at the critical zones where the ends of the tubular membrane join the connections and turn at right angles into the interior of the inner core 52. In addition, the folding and pleating of the ends of the tubular membrane to accommodate it to the outer surface of the plug is minimized. For instance, the connector plug 84 secured to the blood inlet tubing 46 is fixedly positioned in the aperture 58 in the inner tubular core and an aperture provided in the initial wrap of mesh, and the end 66 of the tubular membrane secured thereto makes an approximately right-angle turn (see FIG. 4) to commence the innermost wrap of the coil means. The connector plug 86 secured to the blood outlet tubing 44 is similarly fixedly positioned in the aperture 56, and the end 68 of the tubular membrane secured thereto (FIGS. 5 and 6) makes a first right-angle turn (which may be more gradual than the sharp turn shown in the drawings) upwardly to conclude the outermost wrap of the coil means, and a second right-angle turn for securing to the plug.

When assembled, the coil unit, as can be seen with particular reference to FIG. 3, permits flow of dialyzing fluid through the central opening in the lower collar 78, and the lower wall 54 of the inner core forces dialyzing fluid radially outwardly into the downwardly extending edge of the wraps of supporting mesh. From there, the dialyzing fluid flows upwardly through the wraps of supporting mesh and past the alternating wraps of tubular membrane. At the top of the coil unit, the overhanging portion of the wraps of supporting mesh permit flow of dialyzing fluid first inwardly and then (after filling the core) upwardly out of the coil unit through the center aperture in the upper collar 78, all as indicated by flow arrows 72. The upward course of the dialyzing fluid is predominantly at an angle as determined by the cross-strands of the mesh, but generally axial flow is the result which is desired and achieved.

Blood from an artery of the patient enters the tubular membrane through the blood inlet tubing 46, and travels in a flat, outwardly spiralling passage 64 aided by the longitudinal channelling effect 82 until it reaches the outlet end 68 of the tubular membrane for passage to the blood outlet tubing 44 and back to a vein of the patient, all as indicated by blood flow arrows 98. The flattened blood flow channel 64 has an average width of approximately 700 microns or less, and as can be understood the dialyzing fluid passes laterally of the direction of blood flow on each side of the tubular membrane to perform the dialyzing function of the coil unit of this invention.

While the above described embodiment constitutes the presently preferred mode of practicing this invention, other embodiments and equivalents are included within the scope of the actual invention, which is claimed as:

1. For use in an artificial kidney system of the type including a tank for dialyzing fluid having a support for an artificial kidney coil unit and means for supplying dialyzing fluid to one end of such a coil unit supported within the tank, an artificial kidney coil unit comprising an inner tubular core closed at one end to prevent passage of dialyzing fluid therethrough and open at the other end to provide access for blood inlet tubing and blood outlet tubing to the interior of the core, coil means wrapped around the core including a tubular membrane providing a continuous, elongated spiral blood passage connected at one end to the blood inlet tubing and at the other end to the blood outlet tubing and including membrane supporting mesh spirally wrapped in sandwiched relationship to the tubular membrane and providing a passage for flow of dialyzing fluid from one end of the coil means to the other end thereof, and an outer housing member secured around the coil means, the membrane supporting mesh including essentially parallel strands on one face thereof which are oriented in a longitudinal direction and support one side of one wrap of the tubular membrane and essentially parallel strands on the other face thereof which are oriented at an angle to the longitudinal strands and support the other side of an adjacent wrap of the tubular membrane.

2. An artificial kidney coil unit as in claim 1 wherein the connection between the blood inlet tubing and the tubular membrane and the connection between the blood outlet tubing and the tubular membrane each includes an adapter having a girth somewhat smaller than that of the tubular membranes and substantially greater than that of the blood inlet and outlet tubing, and each adapter is fixedly positioned in an aperture in the inner tubular core.

3. An artificial kidney coil unit as in claim 1 wherein the membrane supporting mesh has a width which is greater than half the girth of the tubular membrane, the strands have a diameter in excess of about 0.3 mm., the essentially parallel strands are spaced apart at least about 0.6 mm., and the strands which are oriented in a longitudinal direction are continuous and are essentially parallel with the edge of the supporting mesh and the strands on the other face thereof are oriented at an angle of at least about 20° to the longitudinal strands.

4. An artificial kidney coil unit as in claim 3 wherein the membrane supporting mesh is non-woven polyolefin having a width of at least about 12 cm., the strands have a diameter of between about 0.3 mm. and about 1.0 mm., and the strands on the other face thereof are oriented at an angle of between about 45° and 90° to the longitudinal strands.

5. An artificial kidney coil unit as in claim 3 wherein the tubular membrane consists of regenerated cellulose produced by the cuprammonia process having a dry thickness in excess of about 10 microns, and is flattened between adjacent wraps of the membrane supporting mesh to provide a blood passage having an average thickness of less than about 700 microns.

6. An artificial kidney coil unit as in claim 5 wherein the tubular membrane has a girth of between about 15 cm. and about 25 cm., and the width of the membrane supporting mesh is at least about 3 cm. greater than half the girth of the tubular membrane.

7. An artificial kidney coil unit as in claim 5 wherein the outer side of the tubular membrane is supported by the face of the mesh which includes the strands oriented in a longitudinal direction to provide a longitudinal channel effect to facilitate flow through the spiral blood passage, and the inner side of the tubular membrane is supported by the face of the mesh which includes the strands oriented at an angle to the longitudinal strands to provide a lateral channel effect for flow of dialyzing fluid from one end of the coil means to the other end thereof.

8. An artificial kidney coil unit as in claim 5 wherein the connection between the blood inlet tubing and the tubular membrane and the connection between the blood outlet tubing and the tubular membrane each includes an adapter having an outer girth of at least about 7.5 cm., means for tightly securing an end of the tubular membrane thereover from one direction, a smaller flow passage therethrough communicating at one end with the blood passage inside the tubular membrane and at the other end with the exterior of the adapter outside the tubular membrane, and means for tightly securing the blood inlet or outlet tubing, respectively, to the smaller flow passage from the other direction.

9. An artificial kidney coil unit as in claim 8 wherein each adapter comprises a tapered plug having a similarly tapered outer sleeve for tightly securing an end of the tubular membrane to the plug, the plug secured to the blood inlet tubing is fixedly positioned in an aperture in the inner tubular core laterally aligned so that the end of the tubular membrane secured thereto makes an approximately right-angle turn to commence the innermost wrap of the coil means, and the plug secured to the blood outlet tubing is fixedly positioned in an aperture in the inner tubular core laterally displaced so that the end of the tubular membrane secured thereto makes a first right-angle turn to conclude the outermost wrap of the coil means and a second right-angle turn for securing to the plug.

10. An artificial kidney coil unit as in claim 9 wherein the wraps of membrane supporting mesh extend laterally of the wraps of tubular membrane, and the plug secured to the blood outlet tubing passes through an aperture in the laterally extending portion of the wraps of supporting mesh.

References Cited

UNITED STATES PATENTS

| | | | |
|---|---|---|---|
| 2,683,117 | 7/1954 | Rosenak et al. | 210—321 |
| 2,880,501 | 4/1959 | Metz | 210—321 X |

REUBEN FRIEDMAN, Primary Examiner

F. A. SPEAR, Jr., Assistant Examiner

U.S. Cl. X.R.

210—494, 541